(12) United States Patent
Li et al.

(10) Patent No.: US 12,093,564 B2
(45) Date of Patent: Sep. 17, 2024

(54) PARTITION COMMAND QUEUES FOR A MEMORY DEVICE

(71) Applicant: Micron Technology, Inc., Boise, ID (US)

(72) Inventors: Juane Li, Milpitas, CA (US); Jason Duong, San Jose, CA (US); Fangfang Zhu, San Jose, CA (US); Chih-Kuo Kao, Fremont, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/445,479

(22) Filed: Aug. 19, 2021

(65) Prior Publication Data

US 2023/0058232 A1 Feb. 23, 2023

(51) Int. Cl.
*G06F 3/06* (2006.01)

(52) U.S. Cl.
CPC .......... *G06F 3/0659* (2013.01); *G06F 3/0611* (2013.01); *G06F 3/0644* (2013.01); *G06F 3/0673* (2013.01)

(58) Field of Classification Search
CPC .... G06F 3/0659; G06F 3/0611; G06F 3/0644; G06F 3/0673
See application file for complete search history.

(56) References Cited

U.S. PATENT DOCUMENTS

| 11,126,254 B1* | 9/2021 | Segev | G06F 1/3275 |
| 2005/0210218 A1* | 9/2005 | Hoogterp | H04L 67/1097 711/159 |
| 2015/0058526 A1* | 2/2015 | Venkata | G06F 3/068 711/103 |
| 2015/0364218 A1* | 12/2015 | Frayer | G06F 11/2094 714/6.13 |
| 2016/0070644 A1* | 3/2016 | D'Sa | G06F 3/0644 711/5 |
| 2016/0179402 A1* | 6/2016 | Iwashiro | G06F 3/0688 711/103 |
| 2019/0146802 A1* | 5/2019 | Kuramoto | G06F 9/30141 712/11 |
| 2020/0106718 A1* | 4/2020 | Lesartre | H04L 47/6275 |
| 2022/0171570 A1* | 6/2022 | Kim | G06F 3/0679 |

* cited by examiner

*Primary Examiner* — Michael Krofcheck
*Assistant Examiner* — Janice M. Girouard
(74) *Attorney, Agent, or Firm* — Lowenstein Sandler LLP

(57) ABSTRACT

A die command from a requestor is received. The die command into a die command queue is stored. The die command from the die command queue into a plurality of partition commands is partitioned. The plurality of partition commands into one of a first plurality of partition command queues or a second plurality of partition command queues is mapped. The partition command of the first plurality of partition command queues or the second plurality of partition command queues is issued to a command processor to be applied to the one or more memory devices.

15 Claims, 9 Drawing Sheets

|      | Partition 3 | Partition 2 | Partition 1 | Partition 0 |
|------|-------------|-------------|-------------|-------------|
| PCQ0 | 24 | 16 | 8  | 0 |
| PCQ1 | 25 | 17 | 9  | 1 |
| PCQ2 | 26 | 18 | 10 | 2 |
| PCQ3 | 27 | 19 | 11 | 3 |
| PCQ4 | 28 | 20 | 12 | 4 |
| PCQ5 | 29 | 21 | 13 | 5 |
| PCQ6 | 30 | 22 | 14 | 6 |
| PCQ7 | 31 | 23 | 15 | 7 |

↙ 520

|      | Partition 3 | Partition 2 | Partition 1 | Partition 0 |
|------|-------------|-------------|-------------|-------------|
| PCQ0 | 17 | 16 | 1  | 0 |
| PCQ1 | 19 | 18 | 3  | 2 |
| PCQ2 | 21 | 20 | 5  | 4 |
| PCQ3 | 23 | 22 | 7  | 6 |
| PCQ4 | 25 | 24 | 9  | 8 |
| PCQ5 | 27 | 26 | 11 | 10 |
| PCQ6 | 29 | 28 | 13 | 12 |
| PCQ7 | 31 | 30 | 15 | 14 |

↙ 522

|      | Partition 3 | Partition 2 | Partition 1 | Partition 0 |
|------|-------------|-------------|-------------|-------------|
| PCQ0 | 3  | 2  | 1  | 0 |
| PCQ1 | 7  | 6  | 5  | 4 |
| PCQ2 | 11 | 10 | 9  | 8 |
| PCQ3 | 15 | 14 | 13 | 12 |
| PCQ4 | 19 | 18 | 17 | 16 |
| PCQ5 | 23 | 22 | 21 | 20 |
| PCQ6 | 27 | 26 | 25 | 24 |
| PCQ7 | 31 | 30 | 29 | 28 |

↙ 524

510

| | Partition 0 |
|---|---|
| PCQ0 | 0 |
| PCQ1 | 1 |
| PCQ2 | 2 |
| PCQ3 | 3 |
| PCQ4 | 4 |
| PCQ5 | 5 |
| PCQ6 | 6 |
| PCQ7 | 7 |
| PCQ8 | 8 |
| PCQ9 | 9 |
| PCQ10 | 10 |
| PCQ11 | 11 |
| PCQ12 | 12 |
| PCQ13 | 13 |
| PCQ14 | 14 |
| PCQ15 | 15 |
| PCQ16 | 16 |
| PCQ17 | 17 |
| PCQ18 | 18 |
| PCQ19 | 19 |
| PCQ20 | 20 |
| PCQ21 | 21 |
| PCQ22 | 22 |
| PCQ23 | 23 |
| PCQ24 | 24 |
| PCQ25 | 25 |
| PCQ26 | 26 |
| PCQ27 | 27 |
| PCQ28 | 28 |
| PCQ29 | 29 |
| PCQ30 | 30 |
| PCQ31 | 31 |

|      | Partition 3 | Partition 2 | Partition 1 | Partition 0 |
|------|---:|---:|---:|---:|
| PCQ0 | 24 | 16 | 8  | 0  |
| PCQ1 | 25 | 17 | 9  | 1  |
| PCQ2 | 26 | 18 | 10 | 2  |
| PCQ3 | 27 | 19 | 11 | 3  |
| PCQ4 | 28 | 20 | 12 | 4  |
| PCQ5 | 29 | 21 | 13 | 5  |
| PCQ6 | 30 | 22 | 14 | 6  |
| PCQ7 | 31 | 23 | 15 | 7  |

520

|      | Partition 3 | Partition 2 | Partition 1 | Partition 0 |
|------|---:|---:|---:|---:|
| PCQ0 | 17 | 16 | 1  | 0  |
| PCQ1 | 19 | 18 | 3  | 2  |
| PCQ2 | 21 | 20 | 5  | 4  |
| PCQ3 | 23 | 22 | 7  | 6  |
| PCQ4 | 25 | 24 | 9  | 8  |
| PCQ5 | 27 | 26 | 11 | 10 |
| PCQ6 | 29 | 28 | 13 | 12 |
| PCQ7 | 31 | 30 | 15 | 14 |

522

|      | Partition 3 | Partition 2 | Partition 1 | Partition 0 |
|------|---:|---:|---:|---:|
| PCQ0 | 3  | 2  | 1  | 0  |
| PCQ1 | 7  | 6  | 5  | 4  |
| PCQ2 | 11 | 10 | 9  | 8  |
| PCQ3 | 15 | 14 | 13 | 12 |
| PCQ4 | 19 | 18 | 17 | 16 |
| PCQ5 | 23 | 22 | 21 | 20 |
| PCQ6 | 27 | 26 | 25 | 24 |
| PCQ7 | 31 | 30 | 29 | 28 |

524

530

|      | Partition 7 | Partition 6 | Partition 5 | Partition 4 | Partition 3 | Partition 2 | Partition 1 | Partition 0 |
|------|---|---|---|---|---|---|---|---|
| PCQ0 | 28 | 24 | 20 | 16 | 12 | 8 | 4 | 0 |
| PCQ1 | 29 | 25 | 21 | 17 | 13 | 9 | 5 | 1 |
| PCQ2 | 30 | 26 | 22 | 18 | 14 | 10 | 6 | 2 |
| PCQ3 | 31 | 27 | 23 | 19 | 15 | 11 | 7 | 3 |

532

|      | Partition 7 | Partition 6 | Partition 5 | Partition 4 | Partition 3 | Partition 2 | Partition 1 | Partition 0 |
|------|---|---|---|---|---|---|---|---|
| PCQ0 | 25 | 24 | 17 | 16 | 9 | 8 | 1 | 0 |
| PCQ1 | 27 | 26 | 19 | 18 | 11 | 10 | 3 | 2 |
| PCQ2 | 29 | 28 | 21 | 20 | 13 | 12 | 5 | 4 |
| PCQ3 | 31 | 30 | 23 | 22 | 15 | 14 | 7 | 6 |

534

|      | Partition 7 | Partition 6 | Partition 5 | Partition 4 | Partition 3 | Partition 2 | Partition 1 | Partition 0 |
|------|---|---|---|---|---|---|---|---|
| PCQ0 | 19 | 18 | 17 | 16 | 3 | 2 | 1 | 0 |
| PCQ1 | 23 | 22 | 21 | 20 | 7 | 6 | 5 | 4 |
| PCQ2 | 27 | 26 | 25 | 24 | 11 | 10 | 9 | 8 |
| PCQ3 | 31 | 30 | 29 | 28 | 15 | 14 | 13 | 12 |

|      | Die # | Partition 1 | Partition 0 |
|------|-------|-------------|-------------|
| PCQ0 | 0 | 1 | 0 |
| PCQ1 | 1 | 1 | 0 |
| PCQ2 | 0 | 3 | 2 |
| PCQ3 | 1 | 3 | 2 |
| PCQ4 | 0 | 5 | 4 |
| PCQ5 | 1 | 5 | 4 |
| PCQ6 | 0 | 7 | 6 |
| PCQ7 | 1 | 7 | 6 |
| PCQ8 | 0 | 9 | 8 |
| PCQ9 | 1 | 9 | 8 |
| PCQ10 | 0 | 11 | 10 |
| PCQ11 | 1 | 11 | 10 |
| PCQ12 | 0 | 13 | 12 |
| PCQ13 | 1 | 13 | 12 |
| PCQ14 | 0 | 15 | 14 |
| PCQ15 | 1 | 15 | 14 |
| PCQ16 | 0 | 17 | 16 |
| PCQ17 | 1 | 17 | 16 |
| PCQ18 | 0 | 19 | 18 |
| PCQ19 | 1 | 19 | 18 |
| PCQ20 | 0 | 21 | 20 |
| PCQ21 | 1 | 21 | 20 |
| PCQ22 | 0 | 23 | 22 |
| PCQ23 | 1 | 23 | 22 |
| PCQ24 | 0 | 25 | 24 |
| PCQ25 | 1 | 25 | 24 |
| PCQ26 | 0 | 27 | 26 |
| PCQ27 | 1 | 27 | 26 |
| PCQ28 | 0 | 29 | 28 |
| PCQ29 | 1 | 29 | 28 |
| PCQ30 | 0 | 31 | 30 |
| PCQ31 | 1 | 31 | 30 |

620

|      | Die # | Partition 3 | Partition 2 | Partition 1 | Partition 0 |
|------|-------|-------------|-------------|-------------|-------------|
| PCQ0 | 0 | 3 | 2 | 1 | 0 |
| PCQ1 | 1 | 3 | 2 | 1 | 0 |
| PCQ2 | 0 | 7 | 6 | 5 | 4 |
| PCQ3 | 1 | 7 | 6 | 5 | 4 |
| PCQ4 | 0 | 11 | 10 | 9 | 8 |
| PCQ5 | 1 | 11 | 10 | 9 | 8 |
| PCQ6 | 0 | 15 | 14 | 13 | 12 |
| PCQ7 | 1 | 15 | 14 | 13 | 12 |
| PCQ8 | 0 | 19 | 18 | 17 | 16 |
| PCQ9 | 1 | 19 | 18 | 17 | 16 |
| PCQ10 | 0 | 23 | 22 | 21 | 20 |
| PCQ11 | 1 | 23 | 22 | 21 | 20 |
| PCQ12 | 0 | 27 | 26 | 25 | 24 |
| PCQ13 | 1 | 27 | 26 | 25 | 24 |
| PCQ14 | 0 | 31 | 30 | 29 | 28 |
| PCQ15 | 1 | 31 | 30 | 29 | 28 |

630

|      | Die # | Partition 3 | Partition 2 | Partition 1 | Partition 0 |
|------|-------|-------------|-------------|-------------|-------------|
| PCQ0 | 0 | 17 | 16 | 1 | 0 |
| PCQ1 | 1 | 17 | 16 | 1 | 0 |
| PCQ2 | 0 | 19 | 18 | 3 | 2 |
| PCQ3 | 1 | 19 | 18 | 3 | 2 |
| PCQ4 | 0 | 21 | 20 | 5 | 4 |
| PCQ5 | 1 | 21 | 20 | 5 | 4 |
| PCQ6 | 0 | 23 | 22 | 7 | 6 |
| PCQ7 | 1 | 23 | 22 | 7 | 6 |
| PCQ8 | 0 | 25 | 24 | 9 | 8 |
| PCQ9 | 1 | 25 | 24 | 9 | 8 |
| PCQ10 | 0 | 27 | 26 | 11 | 10 |
| PCQ11 | 1 | 27 | 26 | 11 | 10 |
| PCQ12 | 0 | 29 | 28 | 13 | 12 |
| PCQ13 | 1 | 29 | 28 | 13 | 12 |
| PCQ14 | 0 | 31 | 30 | 15 | 14 |
| PCQ15 | 1 | 31 | 30 | 15 | 14 |

PARTITION COMMAND QUEUES FOR A MEMORY DEVICE

TECHNICAL FIELD

Embodiments of the disclosure relate generally to memory sub-systems, and more specifically, relate to partition command queues for a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A-5C is an example of populated partition command queues in accordance with some embodiments of the present disclosure.

FIG. 6 is an example of populated partition command queues in accordance with some embodiments of the present disclosure.

DETAILED DESCRIPTION

Figure 1:
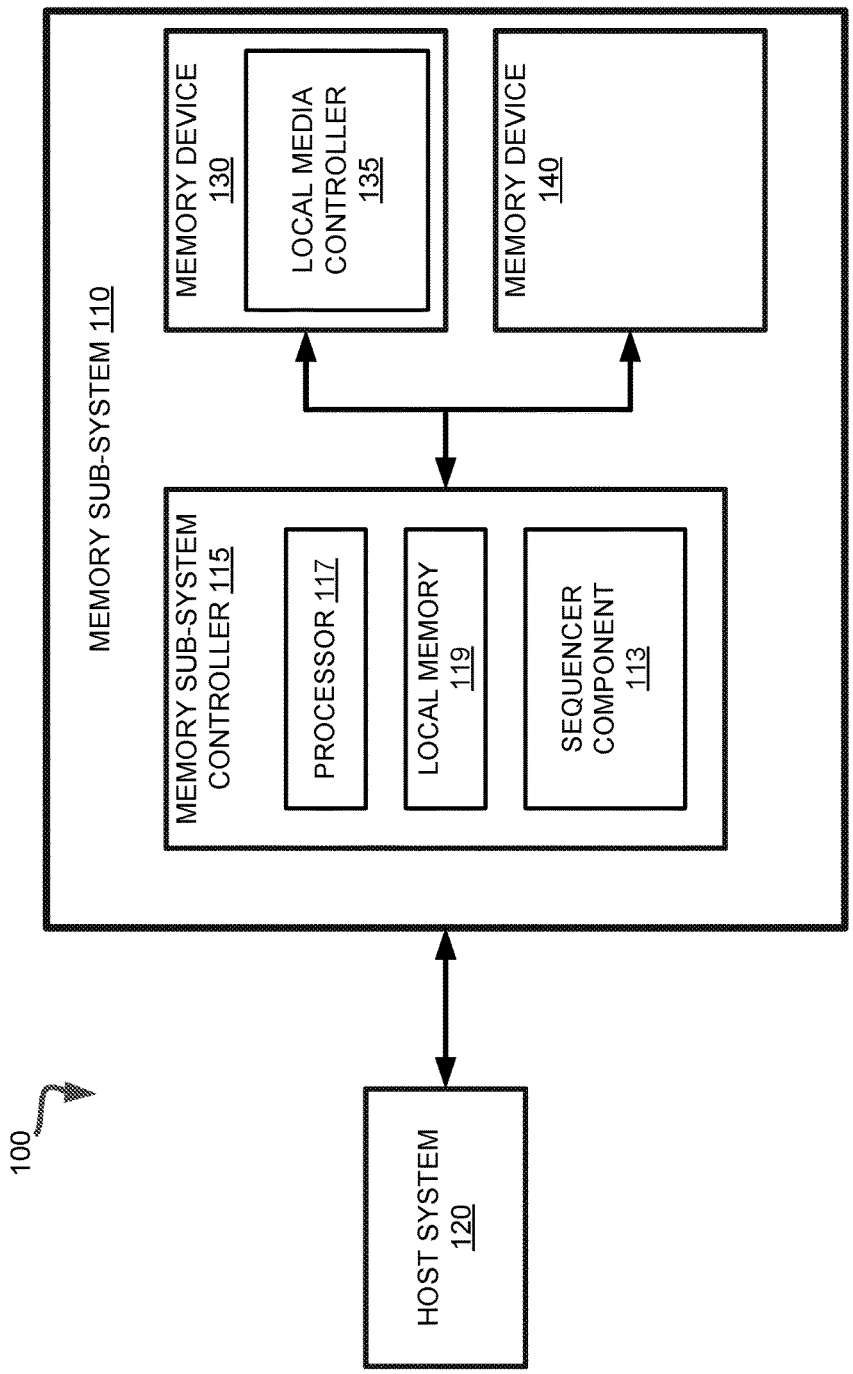
FIG. 1 illustrates an example computing system that includes a memory sub-system in accordance with some embodiments of the present disclosure.

Aspects of the present disclosure are directed to partition command queues for a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Other examples of non-volatile memory devices are described below in conjunction with FIG. 1. A non-volatile memory device is a package of one or more dies. Each die can consist of one or more partitions. Each partition consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The memory sub-system can include a controller that performs various operations at particular memory device of the memory sub-system. For example, the controller can perform a read operation, write operation, or an erase operation at one or more of the memory devices. The controller can include multiple channels that are used to control the one or more of the memory devices. Each channel can correspond to a portion of the controller and interface components that are used to communicate with and perform operations at a respective memory device. For example, a first channel can be used to perform operations at a first memory device and a second channel can be used to perform operations at a second memory device. As such, different channels of the controller can access different memory devices of the memory sub-system.

In a conventional memory sub-system, a controller can include a sequencer component that is used to facilitate the performance of operations at the one or more of the memory devices through the different channels. The sequencer component can receive an operation (e.g., die command) that is to be performed at the memory sub-system and can further receive data corresponding to the operation. For example, the sequencer component can separate the operation into sub-operations (e.g., partition commands) that are to be performed at different memory devices through different channels. As such, the sequencer component can determine the sub-operations for various memory devices at the channels of the controller when an operation is received by the memory sub-system.

The sequencer component of a conventional memory sub-system can determine the partition commands for a single die command at a particular time. For example, a single die command to be performed by the memory sub-system can be received and corresponding partition commands can be determined for each respective memory device from which data is to be read or erased or to which data is to be written. After the partition commands have been determined, the sequencer component can determine operations for particular memory devices. The controller can use the sequencer component to operate on memory devices in a synchronous manner. For example, the controller can use the resulting command of the partition command from the sequencer component to perform a particular type of command (e.g., a read command, write command, or erase command) at memory devices at a particular time and cannot perform another type of command at the same time. Accordingly, conventional memory sub-system must perform the commands on the memory devices in a synchronous manner causing constant switching between different types of commands (e.g., command types) based on a particular time the commands are to be performed and reducing data throughput (e.g., GiB/s).

Aspects of the present disclosure address the above and other deficiencies by providing a memory sub-system that includes one or more plurality of partition command queues in which each plurality of partition command queues are populated based on the type of partition commands (e.g., a read command or write command).

Advantages of the present disclosure include, but are not limited to, increase data throughput limited by constant switching between different command types to perform partition commands on the memory device in a synchronous manner.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a sequencer component 113 that can provide and populate one or more plurality of partition command queues with partition commands based on command types. In some embodiments, the memory sub-system controller 115 includes at least a portion of the sequencer component 113. In some embodiments, the sequencer component 113 is part of the host system 110, an application, or an operating system. In other embodiments, local media controller 135 includes at least a portion of sequencer component 113 and is configured to perform the functionality described herein.

The sequencer component 113 can receive a die command directed to one or more of the memory devices and stores each received die command into a die command queue. The sequencer component 113 partitions each die command in the die command queue into a plurality of partition commands. The sequencer component 113 directs the plurality of partition commands into one of a plurality of partition command queues based on the command of partition commands (e.g., read command or write command) to populate each partition command queue of the plurality of partition command queues. The sequencer component 113 populates the each partition command queue of the plurality of partition command queues by mapping each partition command of the plurality of partition commands to a partition command queue of the plurality of partition command queues based on a predetermined mapping sequence and a partition number assigned to each partition command of the plurality of partition commands. Further details with regards to the operations of the sequencer component 113 are described below.

Figure 2:
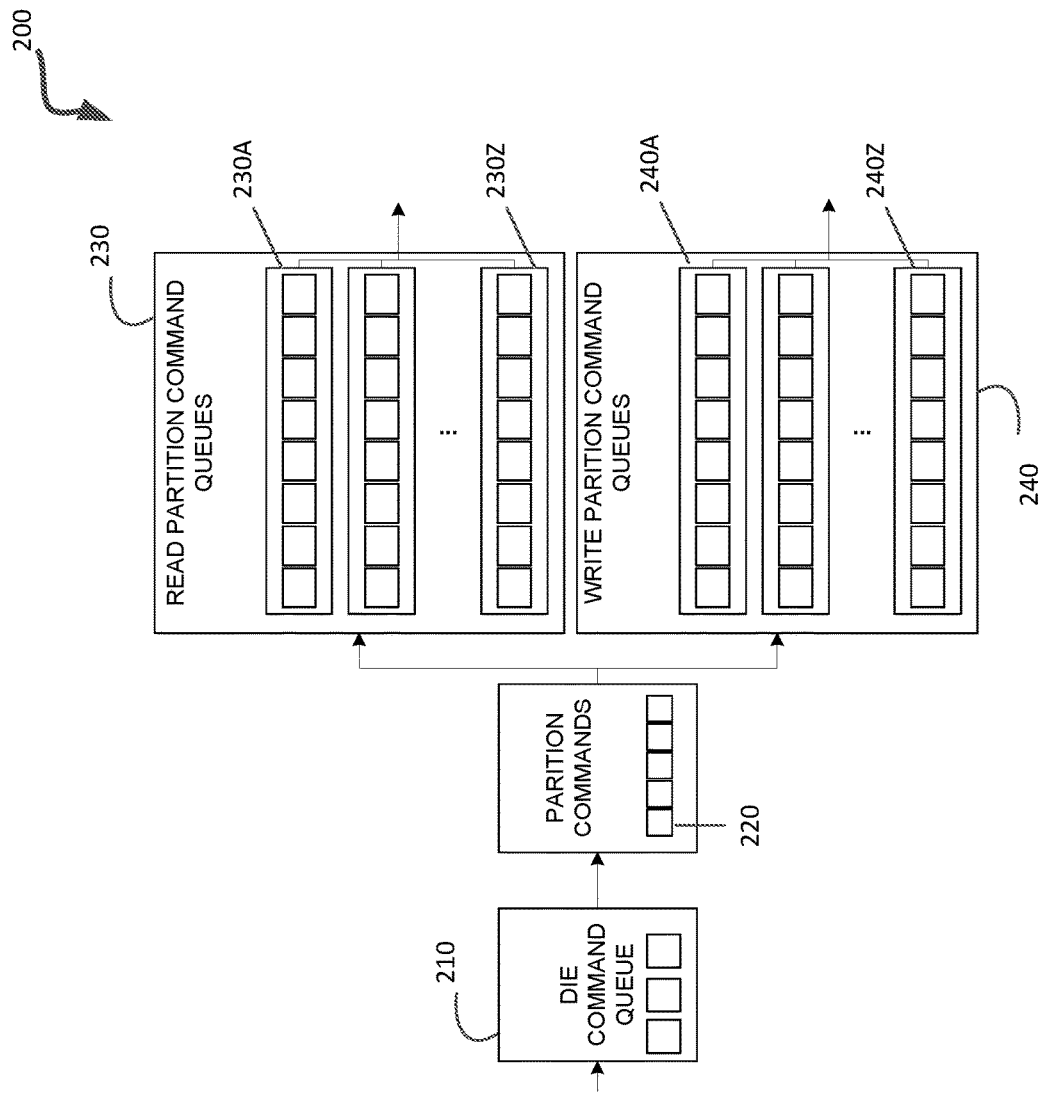
FIG. 2 is a block diagram illustrating partition command queues for a memory device in accordance with some embodiments of the present disclosure.

FIG. 2 is a block diagram illustrating flow diagram of partition command queues for a memory device, in accordance with some embodiments of the present disclosure. The sequencer component 200 (e.g., sequencer component 113) includes a die command queue 210 in which die commands are received from a requestor. The die command in the die command queue 210 is partitioned into a plurality of partition command 220. Each partition command of the plurality of partition command 220 includes a command type and a partition number. Accordingly, based on the command type of the partition command 220, the partition command 220 is mapped to one of a read partition command queue 230 or a write partition command queue 240. Each partition command of the plurality of partition commands 220 mapped to one of the read partition command queues 230 or the write partition command queues 240 is further mapped to one of a plurality of read partition command queues 230A-230Z of the read partition command queues 230 or a plurality of read partition command queues 240A-240Z of the read partition command queues 230 based on the partition number and a predetermined mapping sequence.

Figure 3:
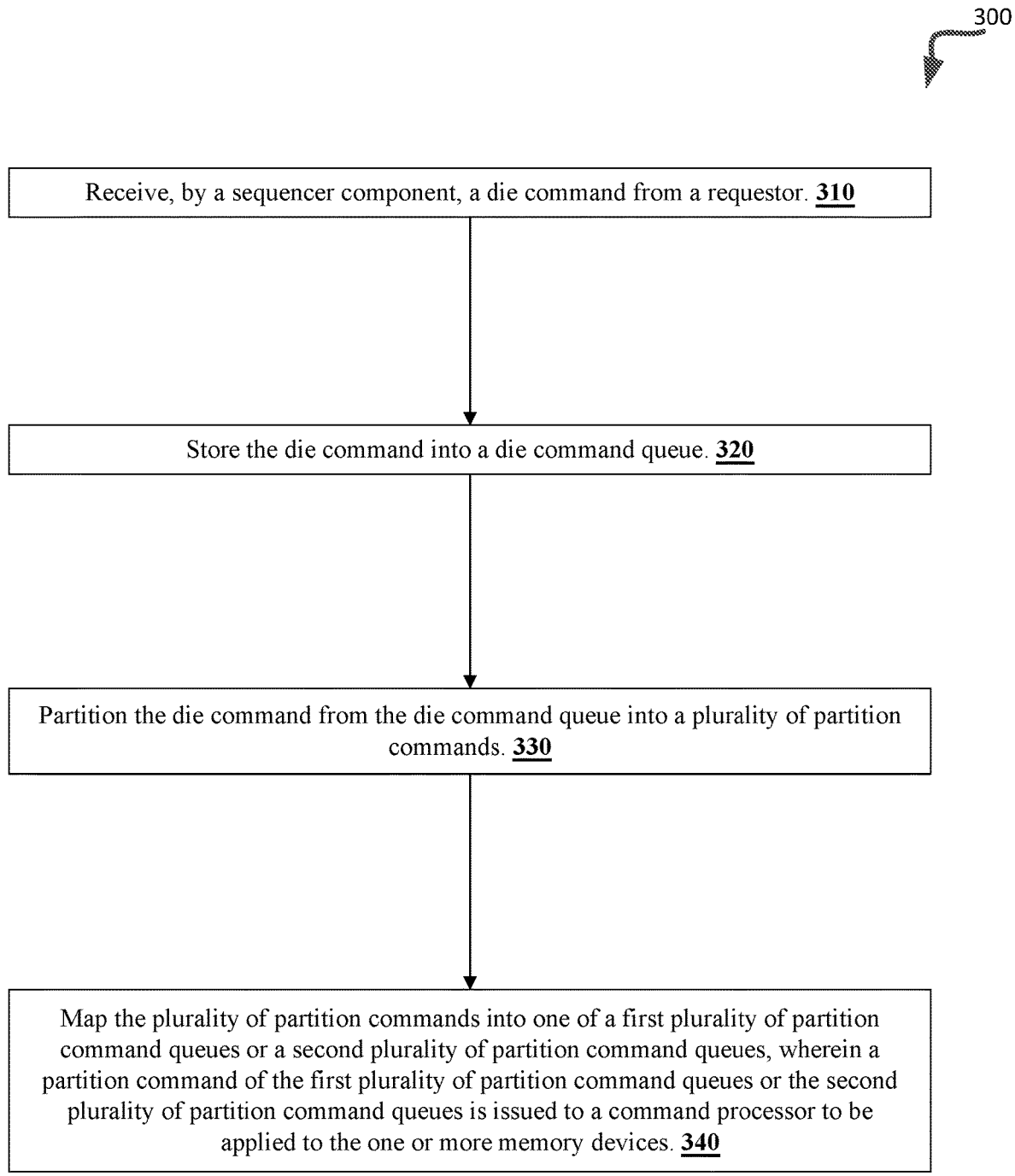
FIG. 3 is a flow diagram of an example method of populating partition command queues for a memory device in accordance with some embodiments of the present disclosure.

FIG. 3 is a flow diagram of an example method 300 to populate partition command queues for a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives, by a sequencer component, a die command from a requestor. The die command comprising one of a read command or write command. At operation 320, the processing logic stores the die command into a die command queue 210.

At operation 330, the processing logic partitions the die command from the die command queue 210 into a plurality of partition commands 220. To partition the die command into a plurality of partition commands 220, the processing logic splits the die command into the plurality of partition commands 220, assigns a command type to the plurality of partition commands based on the die command, and assigns a partition number to each of the plurality of partition commands 220. The partition number is based on a starting partition number and a total number of partition commands associated with the plurality of partition commands. For example, a die command partitioned into a plurality of partition commands 220 will have a command type (write command or read command) assigned to each of the plurality of partition commands 220. Further, the die command may have a starting position of 0 and a total number of partition commands may be 5 (e.g., the total number of partition commands associated with the plurality of partition commands based on the memory device). Accordingly, each partition command of the plurality of partition commands 220 would be assigned, for example, 0 through 4 based on the number of partition commands (e.g., 5) from the starting position (e.g., 0). In yet another example, if the die command has a starting position of 5 and the total number of partition commands is 5, each partition command of the plurality of partition commands 220 would be assigned 5 through 9. Responsive to splitting the die command into the plurality of partition commands 220, the die command is split into five or ten partition commands based the memory devices.

At operation 340, the processing logic maps the plurality of partition commands 220 into one of a first plurality of partition command queues or a second plurality of partition command queues, wherein a partition command of the first plurality of partition command queues or a partition command of the second plurality of partition command queues is issued to a command processor to be applied to the one or more memory devices. The first plurality of partition command queues corresponds to a plurality of read partition command queues 230A-230Z in which each of the read partition command queues stores at least one partition command of the plurality of partition commands associated with a read command. The second plurality of partition command queues corresponds to a plurality of write partition command queues 240A-240Z in which each of the write partition command queues stores at least one partition command of the plurality of partition commands associated with a write command.

To map the plurality of partition commands into one of the first plurality of partition command queues or the second plurality of partition command queues, the processing logic determines, based on the assigned command type, which of the first plurality of partition command queues or the second plurality of partition command queues to map to and maps each of the plurality of partition commands to the determined plurality of partition command queues based on the assigned partition number. To map each of the plurality of partition commands to the determined plurality of partition command queues based on the assigned partition number, the processing logic maps each of the plurality of partition commands based on a predetermined mapping sequence and a predetermined partition command queue limit.

The predetermined mapping sequence is one of a first mapping sequence in which the processing logic maps the plurality of partition commands one by one in each partition command queue of the plurality of partition command queues in consecutive order, a second mapping sequence in which the processing logic maps the plurality of partition commands two by two in each partition command queue of the plurality of partition command queues in consecutive order, or a third mapping sequence in which the processing logic maps the plurality of partition commands four by four in each partition command queue of the plurality of partition command queues in consecutive order. Depending on the embodiment, any suitable grouping (e.g., two by two, three by three, four by four, etc.) used to map the plurality of partition commands into each partition command queue of the plurality of partition command queues in any suitable successive order is contemplated. The predetermined partition command queue limit refers to the number of partition command that can be mapped to each partition command queue of the first plurality of command queues or the second plurality of command queues. The number of first plurality of command queues and the number of second plurality of command queues are based on the predetermined partition command queue limit and can be determined based on dividing the maximum number of partitions for each die of the memory device (e.g., 32 partitions per die).

Figure 4:
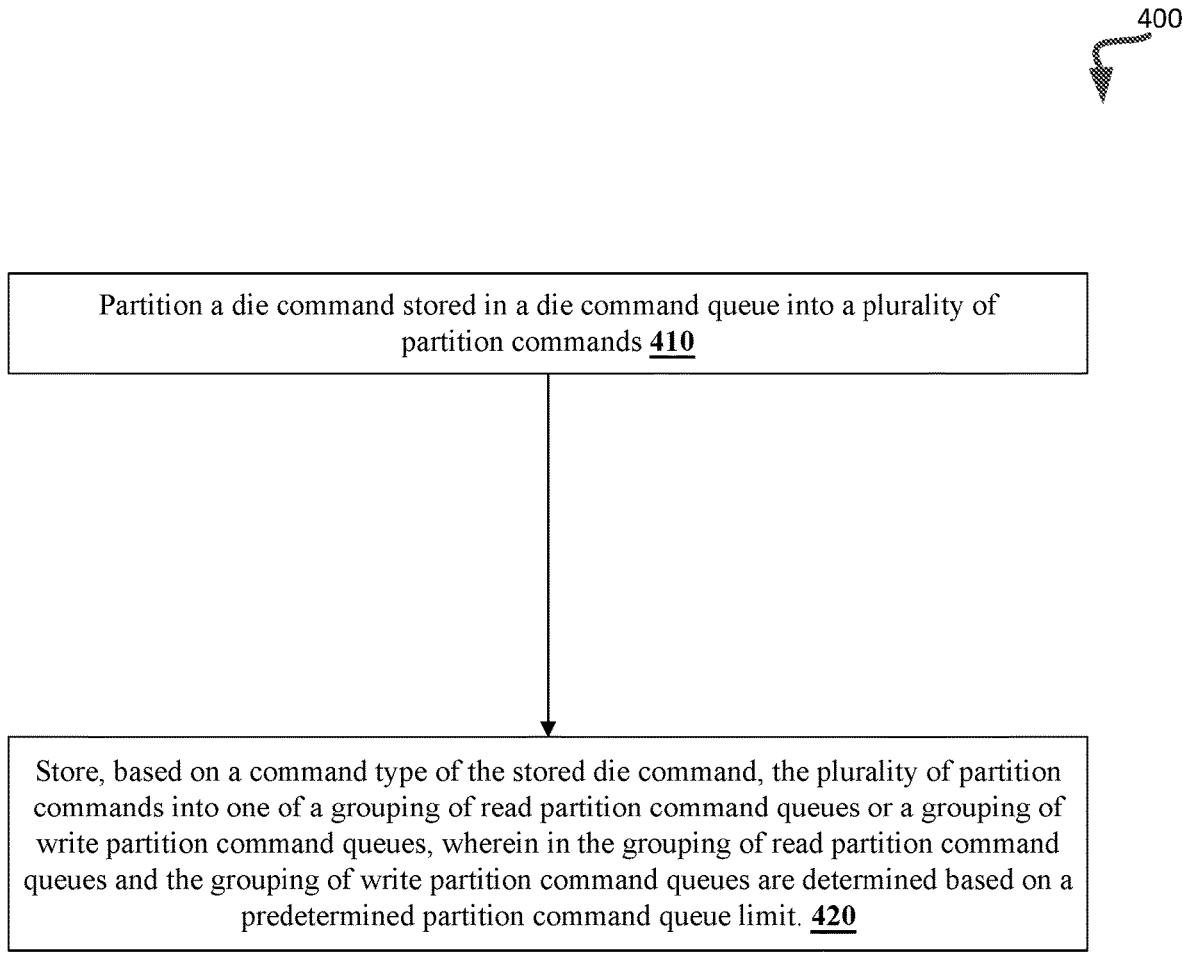
FIG. 4 is a flow diagram of an example method to populating partition command queues for a memory device in accordance with some embodiments of the present disclosure.

FIG. 4 is a flow diagram of an example method 400 to populate partition command queues for a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic partitions a die command stored in a die command queue into a plurality of partition commands. As described previously, the die command comprises one of a read command or write command. To partition the die command into a plurality of partition commands, the processing logic splits the die command into the plurality of partition commands, assigns a command type to the plurality of partition commands based on the die command, and assigns a partition number to each of the plurality of partition commands. The partition number is based on a starting partition number and a total number of partition commands associated with the plurality of partition commands. Splitting the die command into the plurality of partition commands refers to splitting the die command into five or ten partition commands based the memory devices.

At operation 420, the processing logic stores, based on a command type of the stored die command, the plurality of partition commands into one of a plurality of read partition command queues 230A-230Z or a plurality of write partition command queues 240A-240Z, wherein the plurality of read partition command queues 230A-230Z and the plurality of write partition command queues 240A-240Z are determined based on a predetermined partition command queue limit.

Responsive to storing the plurality of partition commands into the plurality of read partition command queues 230A-230Z based on the command type corresponding to a read command, the processing logic maps each of the plurality of partition commands to each of the read partition command queues based on a predetermined mapping sequence and the predetermined partition command queue limit. Responsive to storing the plurality of partition commands into the plurality of write partition command queues 240A-240Z based on the command type corresponding to a write command, the processing logic maps each of the plurality of partition commands to each of the write partition command queues based on a predetermined mapping sequence and the predetermined partition command queue limit.

As described previously, the predetermined mapping sequence is one of a first mapping sequence in which the processing logic maps the plurality of partition commands one by one in each partition command queue of the plurality of partition command queues in consecutive order, a second mapping sequence in which the processing logic maps the plurality of partition commands two by two in each partition command queue of the plurality of partition command queues in consecutive order, or a third mapping sequence in which the processing logic maps the plurality of partition commands four by four in each partition command queue of the plurality of partition command queues in consecutive order. The predetermined partition command queue limit refers to the number of partition command that can be mapped to each partition command queue of the first plurality of command queues or the second plurality of command queues. The number of first plurality of command queues and the number of second plurality of command queues are based on the predetermined partition command queue limit and can be determined based on dividing the maximum number of partitions for each die of the memory device (e.g., 32 partitions per die).

Figure 5A:

FIG. 5A illustrates an example of a populated plurality of partition command queues for a memory device in accordance with some embodiments of the present disclosure. In one embodiment, the plurality of partition command queues 510 has a predetermined partition command queue limit of one partition command per partition command queue (i.e. Partition 0). Accordingly, the mapping sequence of partition commands to the plurality of partition command queues 510 is a first mapping sequence in which each partition command is mapped to each partition command queue of the plurality of partition commands 510 one by one. For example, once a die command is partitioned into a plurality of partition commands and assigned a partition number such that partition command 0 is mapped to partition command queue 0 of the plurality of partition command queues, partition command 1 is mapped to partition command queue 1, and so on.

Figure 5B:
Figure 5B:
Figure 5B:

FIG. 5B illustrates an example of populated plurality of partition command queues for a memory device in accordance with some embodiments of the present disclosure. In one embodiment, a plurality of partition command queues 520, a plurality of partition command queues 522, and a plurality of partition command queues 524 have a predetermined partition command queue limit of four partition command per partition command queue (i.e. Partition 0 through Partition 3). Accordingly, the mapping sequence of partition commands to the plurality of partition command queues can be one of the first mapping sequence, the second mapping sequence, or the third mapping sequence.

Based on the mapping sequence of partition commands corresponding to the first mapping sequence, each partition commands is mapped into the a first partition of each partition command queue of the plurality of partition command queues 520 (e.g., Partition 0 of PCQ0) until the first partition of the last partition command queue (e.g., Partition 0 of PCQ7) is mapped. Once the first partition of the last partition command queue (e.g., Partition 0 of PCQ7) is mapped, each partition command is mapped into the next partition of each partition command queue of the plurality of partition command queues 520 (e.g., Partition 1) starting at the first partition command queue (e.g., PCQ0) of the plurality of partition command queues 520 until the last partition command queue (e.g., PCQ7) of the plurality of partition command queues 520. The mapping of the partition commands is repeated for the next partition of the plurality of partitions command queues until the remaining partition commands are mapped.

In another embodiment, based on the mapping sequence of partition commands corresponding to the second mapping sequence, every two partition commands are mapped into the first two partitions of each partition command queue of the plurality of partition command queues 522 (e.g., Partition 0 and Partition 1 of PCQ0) until the first two partitions of the last partition command queue (e.g., Partition 0 and Partition 1 of PCQ7) are mapped. Once the first two partitions of the last partition command queue (e.g., Partition 0 and Partition 1 of PCQ7) are mapped, every two partition commands are mapped into the next two partitions of each partition command queue of the plurality of partition command queues 522 (e.g., Partition 2 and Partition 3) starting at the first partition command queue (e.g., PCQ0) of the plurality of partition command queues 522 until the last partition command queue (e.g., PCQ7) of the plurality of partition command queues 522. The mapping of the partition commands is repeated for the next two partitions of the plurality of partitions command queues until the remaining partition commands are mapped.

In yet another embodiment, based on the mapping sequence of partition commands corresponding to the third mapping sequence, every four partition commands are mapped to into the first four partitions of each partition command queue of the plurality of partition command queues 524 (e.g., Partition 0 through Partition 3 of PCQ0) until the first four partitions of the last partition command queue (e.g., Partition 0 through Partition 3 of PCQ7) are mapped. Once the first four partitions of the last partition command queue (e.g., Partition 0 through Partition 3 of PCQ7) are mapped.

FIG. 5C illustrates an example of populated plurality of partition command queues for a memory device in accordance with some embodiments of the present disclosure. In one embodiment, a plurality of partition command queues 530, a plurality of partition command queues 532, and a plurality of partition command queues 534 have a predetermined partition command queue limit of eight partition command per partition command queue (i.e. Partition 0 through Partition 7). Accordingly, the mapping sequence of partition commands to the plurality of partition command queues can be one of the first mapping sequence, the second mapping sequence, or the third mapping sequence.

Based on the mapping sequence of partition commands corresponding to the first mapping sequence, each partition commands is mapped into the a first partition of each partition command queue of the plurality of partition command queues 530 (e.g., Partition 0 of PCQ0) until the first partition of the last partition command queue (e.g., Partition 0 of PCQ3) is mapped. Once the first partition of the last partition command queue (e.g., Partition 0 of PCQ3) is mapped, each partition command is mapped into the next partition of each partition command queue of the plurality of partition command queues 530 (e.g., Partition 1) starting at the first partition command queue (e.g., PCQ0) of the plurality of partition command queues 530 until the last partition command queue (e.g., PCQ3) of the plurality of partition command queues 530. The mapping of the partition commands is repeated for the next partition of the plurality of partitions command queues until the remaining partition commands are mapped.

In another embodiment, based on the mapping sequence of partition commands corresponding to the second mapping sequence, every two partition commands are mapped into the first two partitions of each partition command queue of the plurality of partition command queues 532 (e.g., Partition 0 and Partition 1 of PCQ0) until the first two partitions of the last partition command queue (e.g., Partition 0 and Partition 1 of PCQ3) are mapped. Once the first two partitions of the last partition command queue (e.g., Partition 0 and Partition 1 of PCQ3) are mapped, every two partition commands are mapped into the next two partitions of each partition command queue of the plurality of partition command queues 532 (e.g., Partition 2 and Partition 3) starting at the first partition command queue (e.g., PCQ0) of the plurality of partition command queues 532 until the last partition command queue (e.g., PCQ3) of the plurality of partition command queues 532. The mapping of the partition commands is repeated for the next two partitions of the plurality of partitions command queues until the remaining partition commands are mapped.

In yet another embodiment, based on the mapping sequence of partition commands corresponding to the third mapping sequence, every four partition commands are mapped to into the first four partitions of each partition command queue of the plurality of partition command queues 534 (e.g., Partition 0 through Partition 3 of PCQ0) until the first four partitions of the last partition command queue (e.g., Partition 0 through Partition 3 of PCQ3) are mapped. Once the first four partitions of the last partition command queue (e.g., Partition 0 through Partition 3 of PCQ3) are mapped, every four partition commands are mapped into the next four partitions of each partition command queue of the plurality of partition command queues 534 (e.g., Partition 4 through Partition 7) starting at the first partition command queue (e.g., PCQ0) of the plurality of partition command queues 534 until the last partition command queue (e.g., PCQ3) of the plurality of partition command queues 534.

FIG. 6 illustrates an example of populated plurality of partition command queues for a memory device in accordance with some embodiments of the present disclosure. In one embodiment, a plurality of partition command queues 610 may map partition commands directed to different dies of the memory device (e.g., die 0 and die 1). The plurality of partition command queues can have a predetermined partition command queue limit of two partition commands per partition command queue (i.e. Partition 0 and Partition 1). Accordingly, the mapping sequence of partition commands to the plurality of partition command queues can be the second mapping sequence in which every two partition commands directed to a first die (e.g., die 0) is mapped into every other partition command queue of the plurality of partition command queues 610 starting with two partitions of the first partition command queue of the plurality of partition command queues 610 (e.g., Partition 0 and Partition 1 of PCQ0) until the two partitions of the last partition command queue (e.g., Partition 0 and Partition 1 of PCQ30) are mapped.

Once the two partitions of the last partition command queue (e.g., Partition 0 and Partition 1 of PCQ30) are mapped, every two partition commands directed to a second die (e.g., die 1) is mapped into every other partition command queue of the plurality of partition command queues 610 starting with two partitions of the second partition command queue of the plurality of partition command queues 610 (e.g., Partition 0 and Partition 1 of PCQ1) until the two partitions of the last partition command queue (e.g., Partition 0 and Partition 1 of PCQ31) are mapped.

In another embodiment, a plurality of partition command queues 620 may map partition commands directed to different dies of the memory device (e.g., die 0 and die 1). The plurality of partition command queues can have a predetermined partition command queue limit of four partition commands per partition command queue (i.e. Partition 0 through and Partition 3). Accordingly, the mapping sequence of partition commands to the plurality of partition command queues can be the third mapping sequence in which every four partition commands directed to a first die (e.g., die 0) is mapped into every other partition command queue of the plurality of partition command queues 620 starting with the four partitions of the first partition command queue of the plurality of partition command queues 620 (e.g., Partition 0 through Partition 3 of PCQ0) until the four partitions of the last partition command queue (e.g., Partition 0 through Partition 3 of PCQ14) are mapped.

Once the four partitions of the last partition command queue (e.g., Partition 0 through Partition 3 of PCQ14) are mapped, every four partition commands directed to a second die (e.g., die 1) is mapped into every other partition command queue of the plurality of partition command queues 620 starting with four partitions of the second partition command queue of the plurality of partition command queues 620 (e.g., Partition 0 through Partition 3 of PCQ1) until the four partitions of the last partition command queue (e.g., Partition 0 through Partition 3 of PCQ15) are mapped.

In yet another embodiment, a plurality of partition command queues 630 may map partition commands directed to different dies of the memory device (e.g., die 0 and die 1). The plurality of partition command queues can have a predetermined partition command queue limit of four partition commands per partition command queue (i.e. Partition 0 through and Partition 3). Accordingly, the mapping sequence of partition commands to the plurality of partition command queues can be the second mapping sequence in which every two partition commands directed to a first die (e.g., die 0) is mapped into every other partition command queue of the plurality of partition command queues 630 starting with first two partitions of the first partition command queue of the plurality of partition command queues 630 (e.g., Partition 0 and Partition 1 of PCQ0) until the first two partitions of the last partition command queue (e.g., Partition 0 and Partition 1 of PCQ14) are mapped. Once the first two partitions of the last partition command queue (e.g., Partition 0 and Partition 1 of PCQ14) are mapped, every two partition commands are mapped into every other partition command queue of the plurality of partition command queues 630 starting the next two partitions of the first partition command queue of the plurality of partition command queues 630 (e.g., Partition 2 and Partition 3 of PCQ0) until the last partition command queue (e.g., Partition 2 and Partition 3 of PCQ14) are mapped.

Once the partition commands directed to the first die (e.g., die 0) are mapped, every two partition commands directed to a second die (e.g., die 1) is mapped into every other partition command queue of the plurality of partition command queues 630 starting with first two partitions of the second partition command queue of the plurality of partition command queues 630 (e.g., Partition 0 and Partition 1 of PCQ1) until the first two partitions of the last partition command queue (e.g., Partition 0 and Partition 1 of PCQ15) are mapped. Once the first two partitions of the last partition command queue (e.g., Partition 0 and Partition 1 of PCQ15) are mapped, every two partition commands are mapped into every other partition command queue of the plurality of partition command queues 630 starting the next two partitions of the second partition command queue of the plurality of partition command queues 630 (e.g., Partition 2 and Partition 3 of PCQ1) until the last partition command queue (e.g., Partition 2 and Partition 3 of PCQ15) are mapped.

Figure 7:
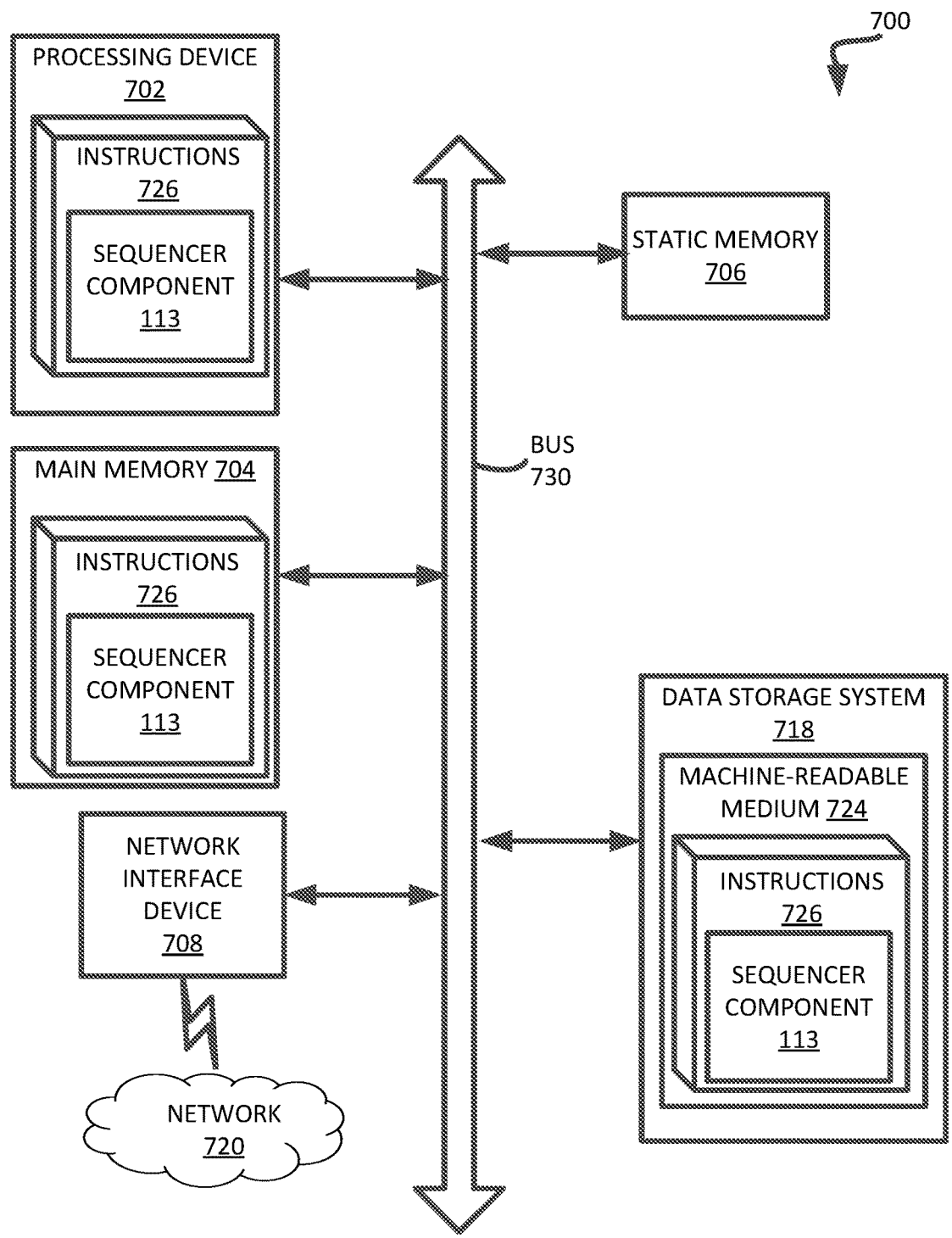
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the sequencer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a dynamic queue component (e.g., the sequencer component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    one or more memory devices; and
    a sequencer component, operatively coupled to the one or more memory devices, the sequencer component to perform operations comprising:
        receiving a die command from a requestor;
        storing the die command into a die command queue;
        partitioning the die command from the die command queue into a plurality of partition commands, wherein each partition command is a sub-operation to be performed at a memory device of the one or more memory devices;
        assigning each partition command of the plurality of partition commands a command type and a partition number, wherein the partition number is based on a starting partition number and a total number of the plurality of partition commands;
        mapping, based on the assigned command type of the plurality of partition commands, the plurality of partition commands to a first partition command queue or a second partition command queue;
        responsive to mapping to the first partition command queue, for each partition of a plurality of partition command queues of the first partition command queue, mapping, in view of a mapping sequence of a plurality of mapping sequences, a subset of the plurality of partition commands to a respective partition of the plurality of partition command queues of the first partition command queue, wherein the plurality of mapping sequences comprises a first mapping sequence which dictates how the plurality of partition commands is mapped one by one in each partition command queue of the plurality of partition command queues, a second mapping sequence which dictates how the plurality of partition commands is mapped two by two in each partition command queue of the plurality of partition command queues, a third mapping sequence which dictates how the plurality of partition commands is mapped three by three in each partition command queue of the plurality of partition command queues, and a fourth mapping sequence which dictates how the plurality of partition commands is mapped four by four in each partition command queue of the plurality of partition command queues; and
        responsive to mapping to the second partition command queue, for each partition of a plurality of partition command queues of the second partition command queue, mapping, in view of the mapping sequence of the plurality of mapping sequence, the subset of the plurality of partition commands to a respective partition of the plurality of partition command queues of the second partition command queue.

2. The system of claim 1, wherein the die command is one of a read command or write command.

3. The system of claim 1, wherein partitioning the die command into a plurality of partition commands includes splitting the die command into the plurality of partition commands.

4. The system of claim 3, wherein splitting the die command into the plurality of partition commands include splitting the die command into five or ten partition commands based on one of the one or more memory devices.

5. The system of claim 1, wherein the plurality of partition command queues of the first partition command queue corresponds to a plurality of read partition command queues, wherein each of the read partition command queues stores at least one partition command of the plurality of partition commands associated with a read command and the plurality of partition command queues of the second partition command queue corresponds to a plurality of write partition command queues, wherein each of the write partition command queues stores at least one partition command of the plurality of partition commands associated with a write command.

6. A method comprising:
receiving, by a sequencer component, a die command from a requestor;
storing the die command into a die command queue;
partitioning the die command from the die command queue into a plurality of partition commands, wherein each partition command is a sub-operation to be performed at a memory device of the one or more memory devices;
assigning each partition command of the plurality of partition commands a command type and a partition number, wherein the partition number is based on a starting partition number and a total number of the plurality of partition commands;
mapping, based on the assigned command type of the plurality of partition commands, the plurality of partition commands to a first partition command queue or a second partition command queue;
responsive to mapping to the first partition command queue, for each partition of a plurality of partition command queues of the first partition command queue, mapping, in view of a mapping sequence of a plurality of mapping sequences, a subset of the plurality of partition commands to a respective partition of the plurality of partition command queues of the first partition command queue, wherein the plurality of mapping sequences comprises a first mapping sequence which dictates how the plurality of partition commands is mapped individually into each partition command queue of the plurality of partition command queues, a second mapping sequence which dictates how the plurality of partition commands are mapped with a set of two partition command into each partition command queue of the plurality of partition command queues, a third mapping sequence which dictates how the plurality of partition commands are mapped with a set of three partition command into each partition command queue of the plurality of partition command queues, and a fourth mapping sequence which dictates how the plurality of partition commands are mapped with a set of four partition command into each partition command queue of the plurality of partition command queues; and
responsive to mapping to the second partition command queue, for each partition of a plurality of partition command queues of the second partition command queue, mapping, in view of the mapping sequence of the plurality of mapping sequence, the subset of the plurality of partition commands to a respective partition of the plurality of partition command queues of the second partition command queue.

7. The method of claim 6, wherein the die command is one of a read command or write command.

8. The method of claim 6, wherein partitioning the die command into a plurality of partition commands includes splitting the die command into the plurality of partition commands.

9. The method of claim 8, wherein splitting the die command into the plurality of partition commands include splitting the die command into five or ten partition commands based on the one or more memory devices.

10. The method of claim 6, wherein the plurality of partition command queues of the first partition command queue corresponds to a plurality of read partition command queues, wherein each of the read partition command queues stores at least one partition command of the plurality of partition commands associated with a read command and the plurality of partition command queues of the second partition command queue corresponds to a plurality of write partition command queues, wherein each of the write partition command queues stores at least one partition command of the plurality of partition commands associated with a write command.

11. A non-transitory computer-readable storage medium comprising instructions that, when executed by a processing device, cause the processing device to perform operations comprising:
receiving, by a sequencer component, a die command from a requestor;
storing the die command into a die command queue;
partitioning the die command from the die command queue into a plurality of partition commands, wherein each partition command is a sub-operation to be performed at a memory device of the one or more memory devices;
assigning each partition command of the plurality of partition commands a command type and a partition number, wherein the partition number is based on a starting partition number and a total number of the plurality of partition commands;
mapping, based on the assigned command type of the plurality of partition commands, the plurality of partition commands to a first partition command queue or a second partition command queue;
responsive to mapping to the first partition command queue, for each partition of a plurality of partition command queues of the first partition command queue, mapping, in view of a mapping sequence of a plurality of mapping sequences, a subset of the plurality of partition commands to a respective partition of the plurality of partition command queues of the first partition command queue, wherein the plurality of mapping sequences comprises a first mapping sequence which dictates how the plurality of partition commands is mapped individually into each partition command queue of the plurality of partition command queues, a second mapping sequence which dictates how the plurality of partition commands are mapped with a set of two partition command into each partition command queue of the plurality of partition command queues, a third mapping sequence which dictates how the plurality of partition commands are mapped with a set of three partition command into each partition command queue of the plurality of partition command queues, and a fourth mapping sequence which dictates how the plurality of partition commands are mapped with a set of four partition command into each partition command queue of the plurality of partition command queues; and
responsive to mapping to the second partition command queue, for each partition of a plurality of partition command queues of the second partition command queue, mapping, in view of the mapping sequence of the plurality of mapping sequence, the subset of the plurality of partition commands to a respective partition of the plurality of partition command queues of the second partition command queue.

12. The non-transitory computer-readable storage medium of claim 11, wherein the die command is one of a read command or write command.

13. The non-transitory computer-readable storage medium of claim 11, wherein partitioning the die command into a plurality of partition commands includes splitting the die command into the plurality of partition commands.

14. The non-transitory computer-readable storage medium of claim 11, wherein splitting the die command into the plurality of partition commands include splitting the die command into five or ten partition commands based on the one or more memory devices.

15. The non-transitory computer-readable storage medium of claim 11, wherein the plurality of partition command queues of the first partition command queue corresponds to a plurality of read partition command queues, wherein each of the read partition command queues stores at least one partition command of the plurality of partition commands associated with a read command and the plurality of partition command queues of the second partition command queue corresponds to a plurality of write partition command queues, wherein each of the write partition command queues stores at least one partition command of the plurality of partition commands associated with a write command.

* * * * *